United States Patent [19]

Walker

[11] 4,204,761
[45] May 27, 1980

[54] LIGHT ENHANCEMENT CAMERA ATTACHMENT

[76] Inventor: Joseph B. Walker, 5164 Don Rodolfo Dr., Carlsbad, Calif. 92008

[21] Appl. No.: 3,556

[22] Filed: Jan. 15, 1979

[51] Int. Cl.² ............................................. G03B 17/00
[52] U.S. Cl. .................................................. 354/202
[58] Field of Search ................. 354/32, 103, 126, 202; 355/65, 67, 71

[56] References Cited

U.S. PATENT DOCUMENTS

| | | | |
|---|---|---|---|
| 1,598,746 | 9/1926 | Roes | 354/126 |
| 2,352,914 | 7/1944 | Rackett | 355/37 |
| 2,556,307 | 6/1951 | Walker | 354/126 |
| 2,621,569 | 12/1952 | Glassey | 354/126 |
| 3,545,859 | 12/1970 | Schumacher | 355/71 |
| 3,836,923 | 9/1974 | Malick | 355/67 |
| 3,854,815 | 12/1974 | McIntosh | 354/32 |

Primary Examiner—L. T. Hix
Assistant Examiner—Thomas H. Tarcza
Attorney, Agent, or Firm—Harry R. Lubcke

[57] ABSTRACT

A camera attachment for providing a low level of diffuse light over a photographic film. This illumination occurs at the time of the exposure of the film. The process may be termed "flashing" and the effect is to make the film more sensitive to light.

The attachment comprises an edge-illuminated transparent disc disposed directly in front of a large aperture photographic lens. An additional annular transparent element may surround the disc. "Softness" for portraiture can also be accomplished.

10 Claims, 9 Drawing Figures

U.S. Patent    May 27, 1980    4,204,761
FIG. 1.
FIG. 2.
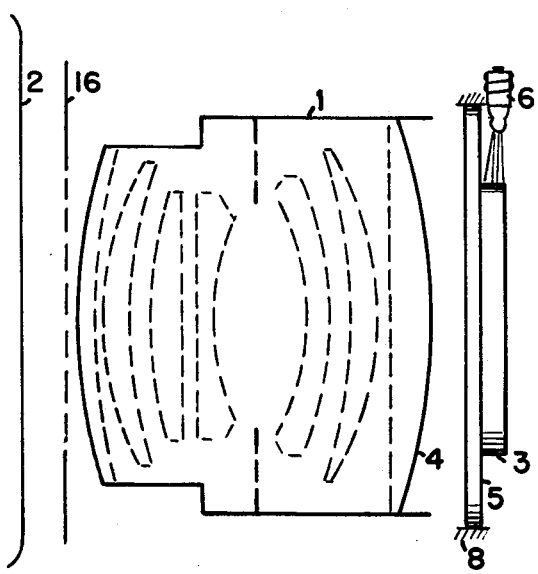
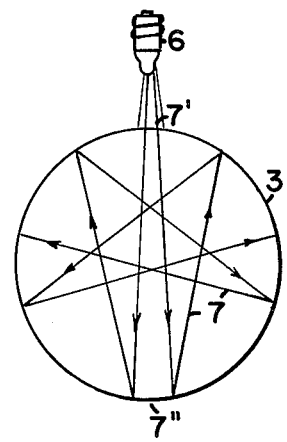
FIG. 6.
6A  6C
6B
FIG. 4.    FIG. 3.
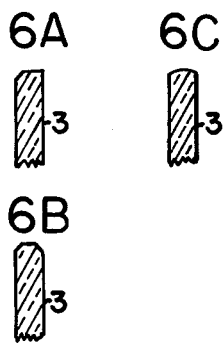
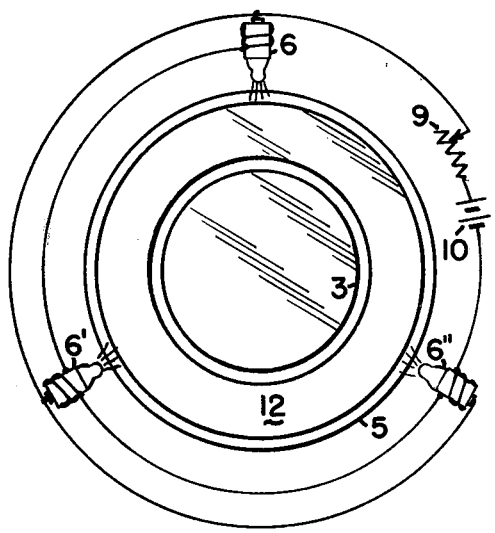
FIG. 7.    FIG. 5.
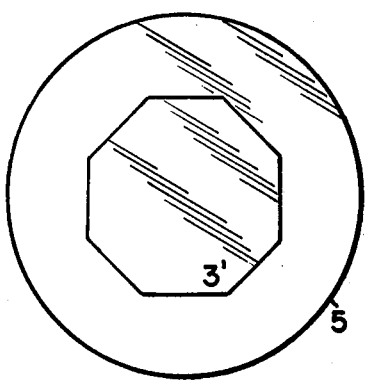
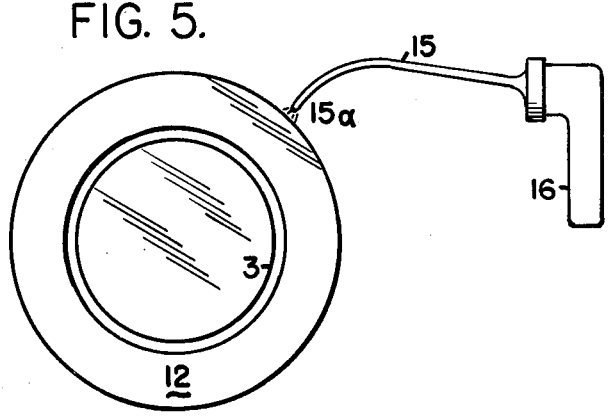

LIGHT ENHANCEMENT CAMERA ATTACHMENT

BACKGROUND OF THE INVENTION

This invention pertains to an attachment to a camera lens for providing a weak diffuse illumination upon the film.

The procedures of "pre-flashing" photographic film before it is exposed to the desired image, or "post-flashing" the same after it has been exposed has long been known.

In addition, certain relatively involved auxiliary optical systems attached to a camera or a printer are also known.

The U.S. Pat. No. 2,556,307, to J. B. Walker, of June 12, 1951 discloses a light box containing a lamp or lamps and a 45° half-silvered mirror to direct flashing light upon a film at the same time it is also exposed with the desired image. The light box is attached to the front of the camera. The box is bulky. The light that forms the desired image is undersirably decreased by the presence of the half-silvered mirror in the main optical path.

U.S. Pat. No. 2,352,914, to G. F. Rackett, of July 4, 1944 provides an additional light beam (2) for simultaneously flashing or separately flashing a positive film in the process of color printing. This light beam also enters the main optical path by means of a half-silvered mirror disposed at 45° thereto.

This arrangement, of course, is part of a positive color printing apparatus.

U.S. Pat. No. 1,598,746 to G. Roes, of Sept. 7, 1926, provides an incandescent lamp (14) on an arm in front of a still-object-photographing camera. This bare lamp is swung into the main optical path in front of the camera after the image exposure is made for a period of from ten to thirty seconds. This gives post-flashing. According to the patent it takes the palce of a large white illuminated "flash sheet".

This arrangement and the method of use are obviously different from the subject invention.

BRIEF SUMMARY OF THE INVENTION

A small attachment fits over the front element of a large aperture lens. The attachment has a transparent element of a diameter smaller than the diameter of the front element of the lens, and is edge-illuminated by means that do not otherwise illuminate the lens. Such edge-illumination at one or more points causes the whole periphery to glow because of repeated internal reflections of the illumination.

The glow is so near to the lens that it is not focused at the film, but impinges upon it as fully diffused illumination.

The attachment accomplishes instant-of-exposure "flashing" of the film. This enhances the photographic sensitivity of the film and can be manipulated to lend portraiture softness.

BRIEF DESCRIPTION OF THE DRAWINGS

FIG. 1 shows a simplified elevation of the operative combination.

FIG. 2 shows a front elevation of only the attachment, in simplified form.

FIG. 3 shows a sectional elevation of an alternate embodiment of only the attachment.

FIG. 4 shows a front elevation of the same alternate embodiment.

FIG. 5 shows a front elevation of a second alternate embodiment of only the attachment.

FIGS. 6A, 6B, 6C show fragmentarily three alternate embodiments of the peripheral edge of the disc of the attachment.

FIg. 7 shows a front elevation of an alternate peripheral shape for the disc of the attachment.

DETAILED DESCRIPTION OF THE INVENTION

In FIG. 1 numeral 1 identifies a known photographic lens. This may be suitable for a motion picture or still camera; not shown. Preferably the lens is of large aperture, i.e., is "fast", or high speed photographically, and has a medium or long focal length.

An example is the Zeiss Planar lens, F 1.4 with a focal length of 85 millimaters (mm) and a film size of 35 mm. A similar lens of 50 mm focal lenght is also suitable.

Film 2 is disposed in the focal plane of the lens, which may be black and white or color sensitive, as regards the film emulsion.

Transparent planar disc 3 of the invention is mounted in any suitable non-interfering optical manner, closely in front of the front element 4 of lens 1. A distance of 6mm is suitable.

A special effect in portraiture can be obtained by increasing this distance to 30 mm or more. The effect is a sharp central area with a light "halo" surround upon the image area of the film. With a 30 mm or more spacing from the lens disc 3 may have a larger diameter than shown in FIG. 1.

A suitable mounting for disc 3 is transparent support 5. It has a diameter in excess of the optical diameter of lens 1. This support can be attached to the front of the lens, or to the case of the camera so long as the spacing from lens to disc is approximately maintained. Such mounting means 8 is schematically shown.

It is important that the surfaces of the disc and of the support be planar, and parallel as well. Irregularities in these surfaces cause optical distortions of the image on film 2, though these are slight as a general matter.

FIG. 2 shows the elemental components of the attachment. Transparent disc 3 is illuminated at a point on the periphery by light source 6. The latter is preferably a built-in-lens flashlight incandescent lamp of the 222 type, although any other similar kind of light source may be used.

Light rays from the lamp enter the periphery of disc 3 at the nearest point thereof. Thereafter the light rays are internally reflected many times, of which light rays 7 are illustrative. This results in the whole periphery being illuminated. It is found that points 7' and 7" are more strongly illuminated than are other points around the periphery. However, this does not detract from the substantial uniformity of the diffuse illumination on film 2.

In passing, the optical phenomenon involved in the internal reflections is similar to that involved in optical fibers or "light pipes".

Substantial uniformity of illumination of the periphery of disc 3 can be attained by adding further lamps spaced around the periphery, This is shown in FIG. 4, and the arrangement may also be employed in FIG. 2. Three lamps, 6, 6' and 6" are spaced at third points around the periphery. The additional lamps are a convenient way of increasing the illumination upon film 2, when such is useful.

It has been found that an amount of light provided by from one to three lamps is useful. Each lamp emits about 5.28 lumens at rated voltage.

As shown in FIG. 4, the lamps 6 may be quite close to the optical elements to conserve light. Also, the light emitted by each lamp can be adjusted electrically, as by providing rheostat 9 in series with a source of electricity, such as batter 10, in an electrical circuit that connects the plural lamps in parallel. The same electrical elements may be connected to the single lamp 6 of FIG. 2.

Alternately, with plural lamps, the lamps can be connected electrically in series and also in series with rheostat 9 and source 10.

An improved embodiment of the optics is shown in FIGS. 3 and 4.

When disc 3 alone is used the focal position of lens 1 is slightly altered. By adding annular transparent planar element 12, with preferably an air gap between the inner surface thereof and the outer periphery of disc 3, this alteration of focus is eliminated.

That is, the slight alteration of focus is made uniform for substantially all of the rays passing through lens 4, and so the clarity of the image is preserved.

Typically, both elements 3 and 12 are the same kind of transparent material and have the same thickness. The annular aperture between them may be 1 or 2 mm. Normally, the two elements are cemented to support 5 by an optically transparent cement, in a coaxial relationship. If, for any reason, the relationship is not coaxial, the invention works, even if the elements touch peripherally. However, they must not be peripherally cemented.

In the embodiment of FIG. 4 it is satisfactory for lamps 6, 6' and 6" to direct light to annular element 12. The light passes through that element and impinges upon the central disc 3, therein to provide the desired diffuse illumination by a lighted periphery as has been previously described.

The light from the inner periphery of annular element 12 contributes to the illumination of film 2, but by only a comparatively small fraction of that contributed by the outer periphery of disc 3.

The transparent material for elements 3 and 5, and also 12, if used, may be any imperfection-free glass, having parallel planar surfaces. One optically acceptable glass is boro-silicate crown.

Normally, the glass will be colorless, but slight tints may be introduced for specific purposes or special effects. Such tinted glass acts as a color filter.

A more delicate and pleasing effect is obtained by using colored lamps 6, with which the highlights in the image remain clear.

The transparent material may also be an optically acceptable clear plastic. One such is an acrylic resin, sold as "Lucite" by Du Pont de Nemours, I. E. & Co.

The optical element structure of the alternate embodiment of FIG. 5 may be any that have been previously shown. Disc 3 and annular element 12 are both shown in FIG. 5.

However, the system for illumination is different.

A fiber optical cable 15 is employed to conduct light to the periphery of the outer annular optical element 12.

A rounded tip 15a is preferably supplied at the light exit end of the fiber optical cable. The tip may touch or not touch the outer periphery of annular element 12.

The rounded tip has a lens effect, focusing the light forward away from the run of the cable.

The fiber optical cable can conveniently be attached to a strobe flash unit 16. This arrangement is well suited for a still picture camera. One strobe flash is made to occur during the time the film 2 is exposed to the desired field of view.

FIG. 6 shows alternate embodiments for the periphery of transparent disc 3. If the periphery is given a cross-section other than that perpendicular to the planar surface of the disc, as shown in FIG. 1, a greater proportion of the light that impinges on the whole periphery is transmitted into lens 1.

In FIG. 6A the periphery is beveled on the side next to lens 1.

In FIG. 6B the periphery is beveled on both sides, dispersing somewhat more light into the lens.

In FIG. 6C the periphery is rounded with a radius equal to, or greater, than the full thickness of disc 3.

Any of the peripheral surfaces may be given a "rough grind", rather than being polished. Such a grind results in more light being emitted from the periphery for a given light input.

FIG. 7 illustrates a further embodiment, in which the periphery of the disc 3' is not circular, as was disc 3. The shape shown is octagonal. A star shape and even a square are also satisfactory. The periphery illumination from these shapes is fully diffuse as the illumination reaches film 2. The only restriction to the shapes is that disc 3' shall not noticably interfere with the image-forming rays entering lens 1.

The camera includes, of course, shutter means 16, such that, when open, admits the illumination from the periphery of disc 3 concomitantly with the exposure of film 2 to the field of view to be photographed.

I Claim:
1. An attachment to a camera having a photographic lens, comprising;
   (a) a transparent planar disc, smaller in periphery than the periphery of the front lens element of said photographic lens,
   (b) means to hold said transparent disc in close proximity to said front lens element while photography is accomplished, and
   (c) a visible light source exclusively directed at the periphery of said transparent disc,
to cause substantially the whole of said periphery of the transparent disc to glow with light.

2. The attachment of claim 1, in which said means to hold comprises;
   (a) a transparent planar disc support having a perimeter peripherally greater than the periphery of the front lens element.

3. The attachment of claim 1, in which said light source comprises;
   (a) plural sources of light, spaced one from the other, around the periphery of said transparent disc.

4. The attachment of claim 1, which additionally includes;
   (a) an annular transparent planar element substantially concentrically and coplanarly surrounding said transparent disc and radially spaced from said transparent disc.

5. The attachment of claim 1, in which;
   (a) the periphery of said transparent disc has a rounded cross-section, to thereby increase the luminous area of said periphery with respect to the front lens element of said photographic lens.

6. The attachment of claim 1, in which;
   (a) the periphery of said transparent disc has a beveled cross-section,
to thereby increase the luminous area of said periphery with respect to the front lens element of said photographic lens.

7. The attachment of claim 1, in which;
   (a) the surface of the pheriphery of said transparent disc has a rough grind to enhance the amount of light emitted therefrom.

8. The attachment of claim 1, in which;
   (a) said transparent disc is of boro-silicate crown glass material.

9. The attachment of claim 1, in which;
   (a) said transparent acrylic resin disc is of transparent plastic material.

10. The attachment of claim 1, in which said light source comprises;
    (a) a flash type light source disposed away from the periphery of said transparent disc, and
    (b) fiber optic means positioned between the source and the periphery
to convey light from the source to the periphery.

* * * * *